United States Patent
Chou et al.

(10) Patent No.: US 7,265,502 B1
(45) Date of Patent: Sep. 4, 2007

(54) DIMMING APPARATUS OF LIGHT EMITTING UNIT

(75) Inventors: Chin-Wen Chou, Taipei Hsien (TW); Ying-Nan Cheng, Taipei Hsien (TW); Chin-Biau Chung, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 0 days.

(21) Appl. No.: 11/516,548

(22) Filed: Sep. 7, 2006

(51) Int. Cl.
*G05F 1/00* (2006.01)

(52) U.S. Cl. .................. 315/291; 315/224; 315/200 R; 315/247; 315/308; 315/209 R

(58) Field of Classification Search .............. 315/291, 315/224, 209 R, 200 R, 308, 247, 276, 283, 315/307, 284
See application file for complete search history.

(56) References Cited

U.S. PATENT DOCUMENTS

| | | | |
|---|---|---|---|
| 4,789,992 A * | 12/1988 | Wickersheim et al. ...... 374/161 |
| 6,044,003 A * | 3/2000 | Toshinari et al. ............. 363/97 |
| 6,507,343 B1 * | 1/2003 | MacPhail ..................... 345/440 |
| 6,509,699 B2 * | 1/2003 | Kim et al. ................... 315/291 |
| 6,822,547 B2 * | 11/2004 | Saito et al. ................. 336/200 |
| 6,943,503 B2 * | 9/2005 | Ozasa et al. ................ 315/224 |

FOREIGN PATENT DOCUMENTS

TW M248963 U 11/2004

* cited by examiner

*Primary Examiner*—Tho Phan
*Assistant Examiner*—Chuc Tran
(74) *Attorney, Agent, or Firm*—Birch, Stewart, Kolasch & Birch, LLP

(57) ABSTRACT

The present invention discloses a dimming apparatus of a light emitting unit that uses a sensor to detect an external signal such as sound, shadow, temperature or digital image for changing the light emitting conditions such as brightness, color, frequency or blinking of the light emitting unit, so as to achieve the audio/video entertainment effects.

13 Claims, 3 Drawing Sheets

DIMMING APPARATUS OF LIGHT EMITTING UNIT

FIELD OF THE INVENTION

The present invention relates to a dimming apparatus of a light emitting unit, and more particularly to a dimming apparatus of a light emitting unit that changes the light emission of the light emitting unit by detecting an external signal.

BACKGROUND OF THE INVENTION

As science and technology advance, the applications of high-tech products are used more extensively in many areas including the aspects of basic necessities of life such as food, clothing, housing, transportation, education and recreation, and these applications have significant effects on us. In recent years, people pay more attentions on life quality and recreational products, and most technological applications tend to be shifted to "multimedia entertainment". For example, existing lamps usually change their brightness by the control of a switch, and such lamps also provide additional functions such as a sound control or a light control for changing the light effects. A fixed sound controlled LED lamp capable of controlling the light and having a rotary effect as disclosed in R.O.C. Pat. No. M248963 comprises a lamp casing and a lamp holder engaged with the lamp casing, as well as internal components such as a sound receiver, a circular LED, a circuit board, a control circuit board, and a rectangular LED circuit board. These components are connected in series to provide the effects of controlling an LED lamp based on the volume, speed and rhythm of music and providing the blinking and rotation effects by a sound control.

Since the technologies for gas discharge lamps are well developed now and the price of gas discharge lamps becomes acceptable by consumers, therefore the market of gas discharge lamps grows rapidly. More specifically, the even brightness of cold cathode fluorescent lamps (CCFL) and the high brightness of the high intensity lamps (such as the helium lamp) create a large demand in the market. However, the dimming apparatus of the foregoing lamps adjusts the light emitting conditions of the lamp manually or by means of its feedback signal, so that consumers cannot create the video entertainment effects for the gas discharge lamps, and thus such lamps cannot be used flexibly.

SUMMARY OF THE INVENTION

The primary objective of the present invention is to use a sensor unit to detect an external signal such as sound, shadow, temperature or digital image for changing the light emitting conditions such as brightness, wavelength, or blinking status of the light emitting unit, and achieving the audio/video entertainment effects.

To achieve the foregoing objective, a dimming apparatus of a light emitting unit of the invention comprises: a power supply unit for supplying a driving electric power; a driving unit electrically coupled to power supply unit for generating a working frequency to divide the driving electric power supplied by the power supply unit; a transformer unit for converting the voltage of the driving electric power of the power supply unit into a high voltage power by means of the working frequency of the driving unit to drive a back-end light emitting unit to emit lights; and at least one sensor unit for detecting and converting an external signal into a floating frequency reference signal, and the floating frequency reference signal is provided for adjusting the working frequency of the driving unit.

DETAILED DESCRIPTION OF THE PREFERRED EMBODIMENTS

To make it easier for our examiner to understand the objective of the invention, its structure, innovative features, and performance, we use a preferred embodiment together with the attached drawings for the detailed description of the invention.

Figure 1:
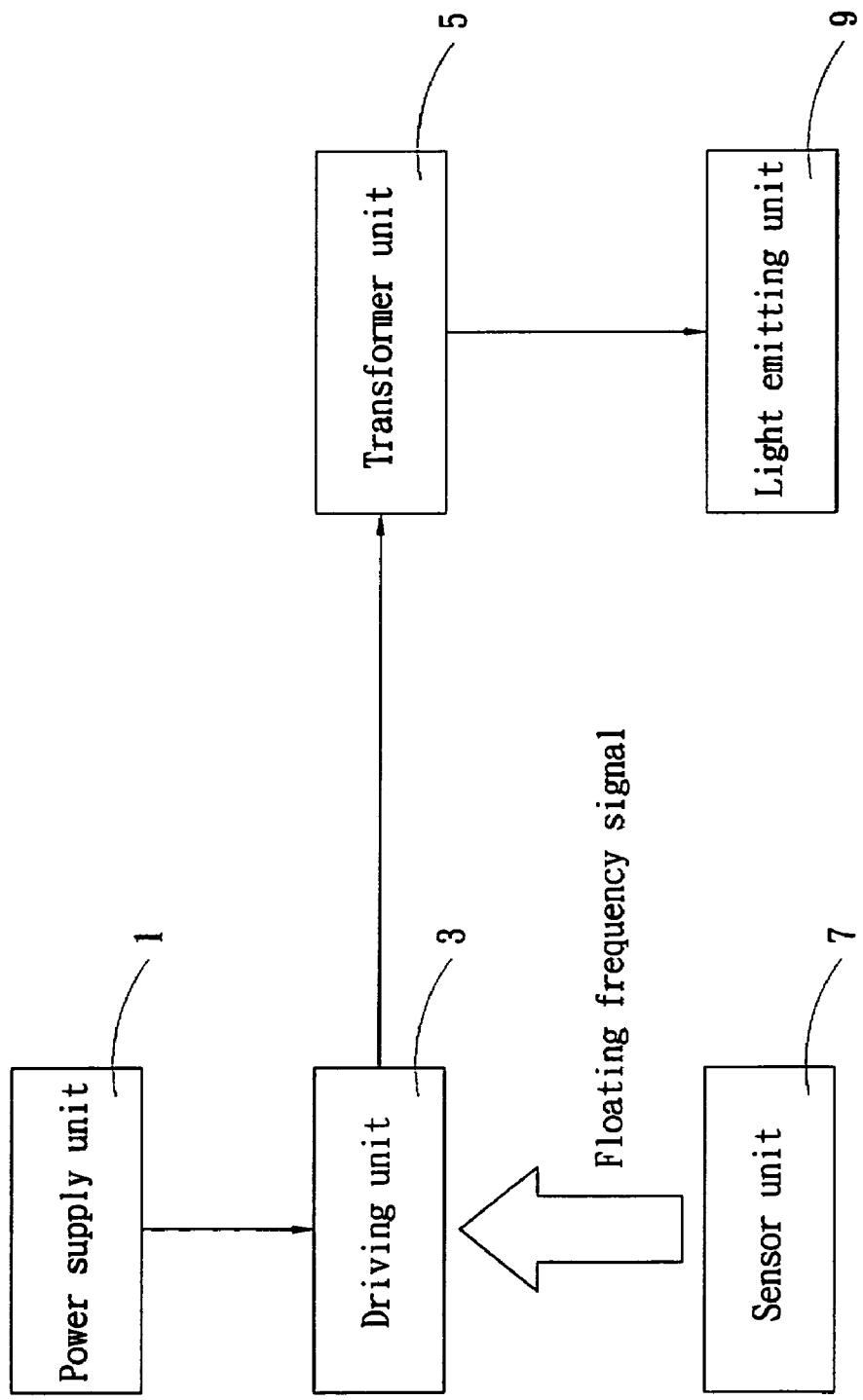
FIG. 1 is a schematic block diagram of a preferred embodiment of the present invention.
Figure 2:
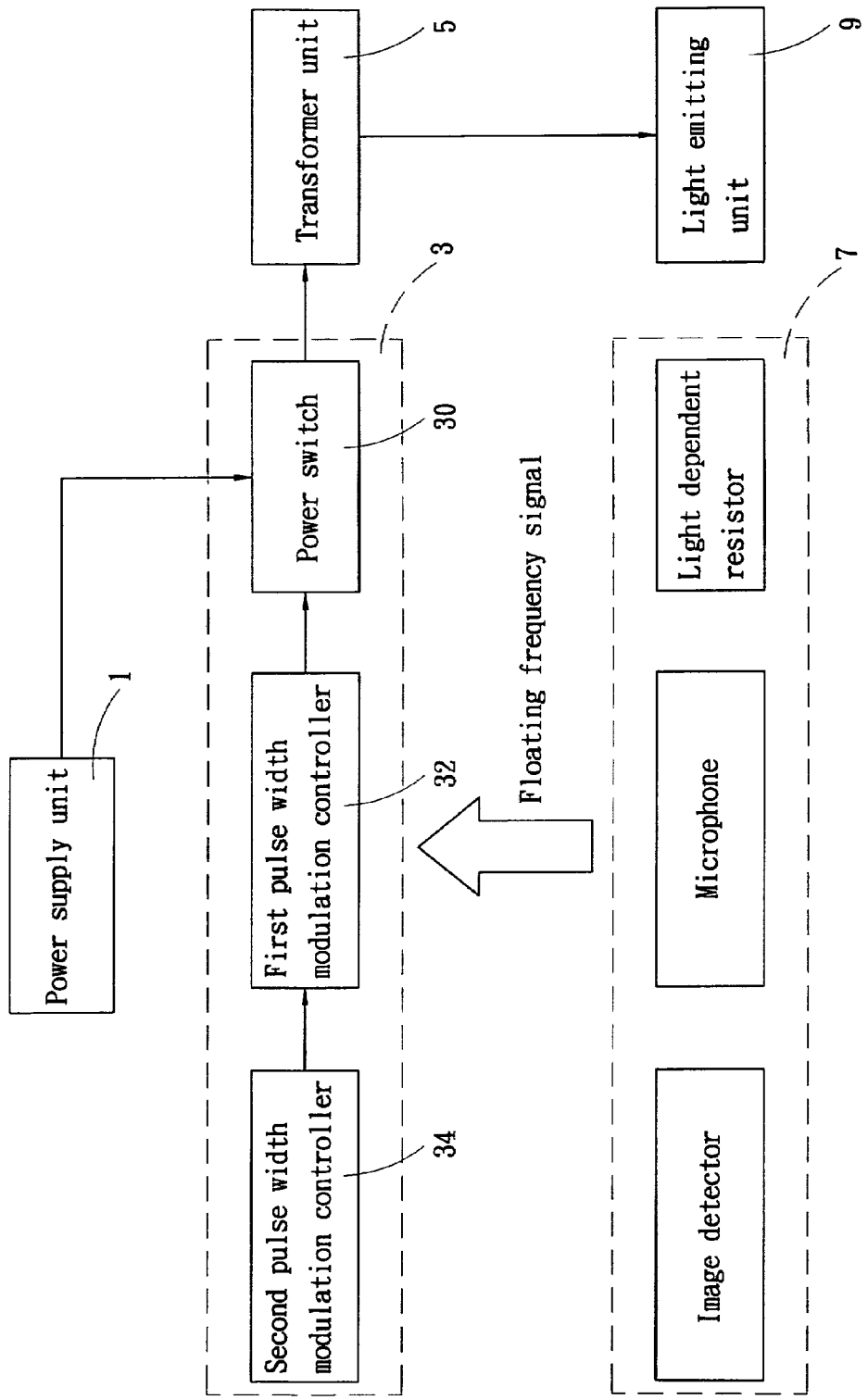
FIG. 2 is another schematic block diagram of a preferred embodiment of the present invention.
Figure 3:
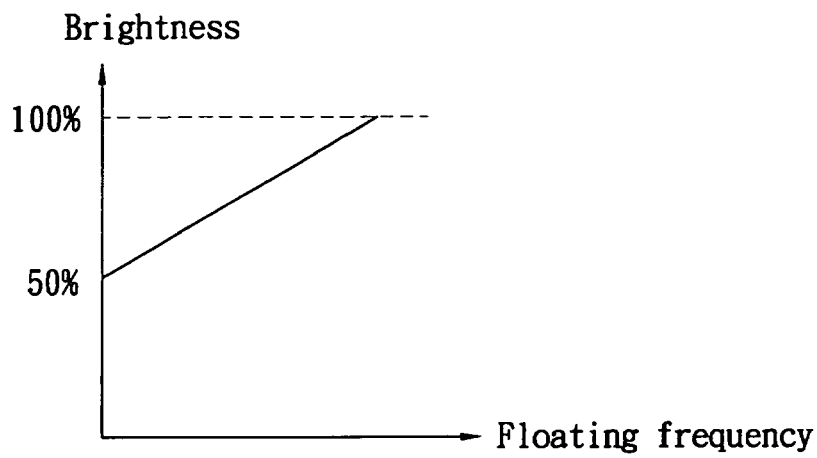
FIG. 3 is a graph of floating frequency versus brightness in accordance with a preferred embodiment of the present invention.
Figure 4:
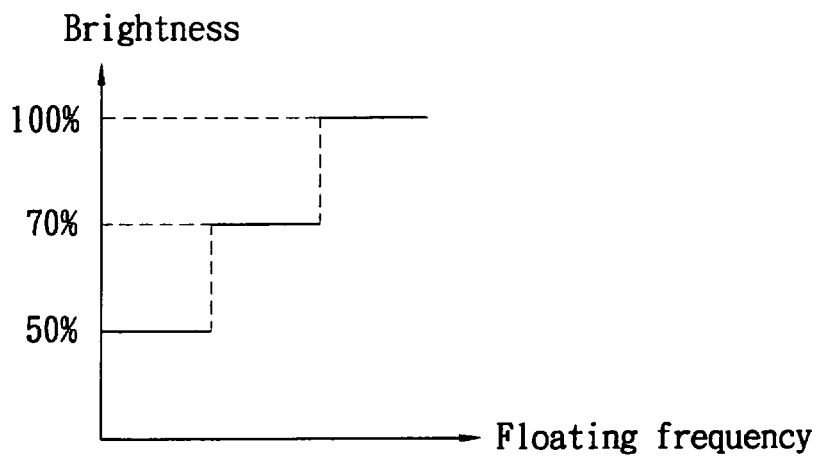
FIG. 4 is a graph of floating frequency versus brightness in accordance with a preferred embodiment of the present invention.
Figure 5:
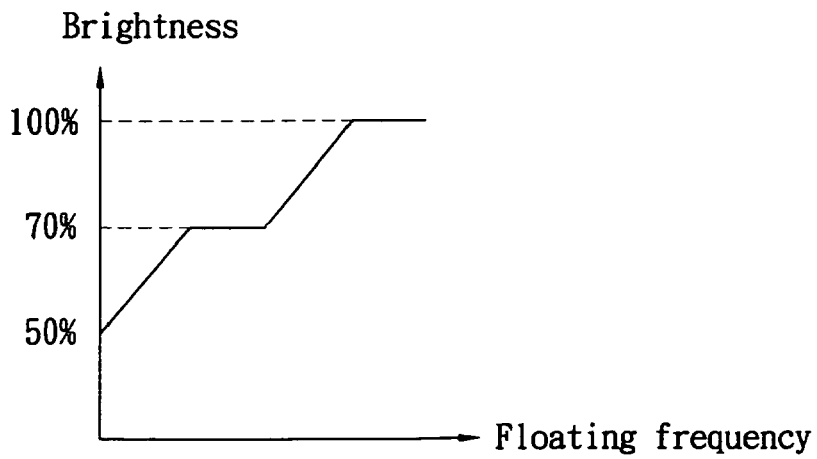
FIG. 5 is a graph of floating frequency versus brightness in accordance with a preferred embodiment of the present invention.

Referring to FIGS. 1 and 2 for schematic block diagrams of a preferred embodiment of the present invention, the present invention provides a dimming apparatus of a light emitting unit for adjusting the light emitting conditions of at least one light emitting unit 9, wherein the light emitting unit 9 is preferably a gas discharge lamp such as a helium lamp (high intensity discharging lamp, HID), a hot cathode fluorescent lamp (HCFL), a cold cathode fluorescent lamp (CCFL) or an external electrode fluorescent lamp (EEFL). The dimming apparatus of a light emitting unit of the invention comprises:

a power supply unit 1, for supplying a driving electric power, and the power driving electric power of this embodiment is provided for receiving electric power from the utility electricity and converting the electric power into a DC power for the output after the electric power is filtered and rectified;

a driving unit 3, electrically coupled to power supply unit 1, for generating a working frequency to divide the driving electric power supplied by the power supply unit 1, and using the working frequency to adjust the light emitting conditions of the light emitting unit 9; the driving unit 3 of this embodiment includes a power switch 30 coupled to the power supply unit 1 and a first pulse width modulation (PWM) controller 32 coupled to the power switch 30, and the front-end of the first pulse width modulation controller 32 is coupled to a second pulse width modulation controller 34 for providing a brightness level signal for the light emitting unit 9, and the first pulse width modulation controller 32 is provided for controlling the maximum brightness of the light emitting unit 9, and the second pulse width modulation controller 34 is provided for controlling the range of brightness of the light emitting unit 9, wherein the power switch 30 is preferably made of transistors. A brightness level signal of the light emitting unit 9 is provided for adjusting the working frequency and affecting the brightness of the light emitting unit 9, and a common way of adjusting the brightness of the light emitting unit 9 is based on the relation of a direct proportion with the working frequency;

a transformer unit 5, for converting the voltage of a working frequency of driving unit 3 into a high voltage power by the driving electric power of the power supply unit 1, and driving a back-end light emitting unit 9 to emit lights, and the transformer unit 5 could be a magnetic inducing transformer or a piezoceramic transformer (PZT); and at least one sensor unit 7, for detecting an external signal (such as video frequency signal, temperature signal, optical signal or image signal) and converting the external signal to a floating frequency reference signal, wherein the floating frequency reference signal is used for adjusting the working frequency of the driving unit 3 and changing the light emitting conditions (such as brightness, wavelength or blinking status) of the light emitting unit 9; and the sensor unit 7 could be a microphone, a thermal sensor, a light dependent resistor or an image detector, and the image detector is provided for measuring the image signal (such as RGB signal or YPrPb signal); and the floating frequency reference signal adjusted by the driving unit 3 is directly proportional to the range of brightness of the light emitting unit 9 (as shown in FIG. 3), or comes with a step change (as shown in FIG. 4) or a gentle step change (as shown in FIG. 5).

In this embodiment, the floating frequency reference signal is used for adjusting the brightness of the light emitting unit 9, but in actual practices, the floating frequency reference signal also can be used for adjusting the light emitting conditions such as the wavelength of the light emitting unit 9 or its blinking status (or dimming).

In summation of the description above, the dimming apparatus of a light emitting unit of the invention uses a sensor unit 7 to detect an external signal such as sound, shadow, temperature or image signal for changing the brightness, wavelength or the blinking status (or dimming) of the light emitting unit 9, so as to achieve the audio/video entertainment effects. Therefore, the sensor unit 7 provides a flexible application of the light emitting unit 9 to meet consumer requirements and improve the competitiveness of a manufacturer in the industry.

In summation of the description above, the patent specification and its related drawings have been applied for manufacturing and producing samples that have been passed many tests and used for many times, and such samples can achieve the expected purposes and performances, and thus the invention is useful in the industry and complies with the patent application requirements, and duly filed for patent application.

What is claimed is:

1. A dimming apparatus of a light emitting unit, applied for adjusting at least one light emitting condition of said light emitting unit, comprising:
   a power supply unit, for supplying a driving electric power;
   a driving unit, electrically coupled to said power supply unit, for producing a working frequency to divide said driving electric power supplied by said power supply unit;
   a transformer unit, for converting the voltage of said driving electric power of said power supply unit by the working frequency of said driving unit into a high voltage power for driving a back-end light emitting unit to emit lights; and
   at least one sensor unit, for detecting and converting an external signal into a floating frequency reference signal, and said floating frequency reference signal being provided for adjusting the working frequency of said driving unit.

2. The dimming apparatus of a light emitting unit of claim 1, wherein said sensor unit is a microphone, and said external signal is an audio frequency signal.

3. The dimming apparatus of a light emitting unit of claim 1, wherein said sensor unit is a thermal sensor, and said external signal is a temperature signal.

4. The dimming apparatus of a light emitting unit of claim 1, wherein said sensor unit is a light dependent resistor, and said external signal is an optical signal.

5. The dimming apparatus of a light emitting unit of claim 1, wherein said sensor unit is an image detector, and said external signal is an image signal.

6. The dimming apparatus of a light emitting unit of claim 1, wherein said driving unit comprises a power switch coupled to said power supply unit and a first pulse width modulation controller coupled to said power switch.

7. The dimming apparatus of a light emitting unit of claim 6, wherein said sensor unit is electrically coupled to said first pulse width modulation controller.

8. The dimming apparatus of a light emitting unit of claim 6, wherein said sensor unit is electrically coupled to said power switch in said driving unit.

9. The dimming apparatus of a light emitting unit of claim 6, wherein said first pulse width modulation controller has its front end coupled to a second pulse width modulation controller for providing a brightness level signal to said light emitting unit.

10. The dimming apparatus of a light emitting unit of claim 9, wherein said sensor unit is electrically coupled to said second pulse width modulation controller.

11. The dimming apparatus of a light emitting unit of claim 1, wherein said light emitting unit is a gas discharge lamp.

12. The dimming apparatus of a light emitting unit of claim 11, wherein said light emitting unit is a cold cathode fluorescent lamp.

13. The dimming apparatus of a light emitting unit of claim 11, wherein said light emitting unit is an external electrode fluorescent lamp.

* * * * *